Figure 1:
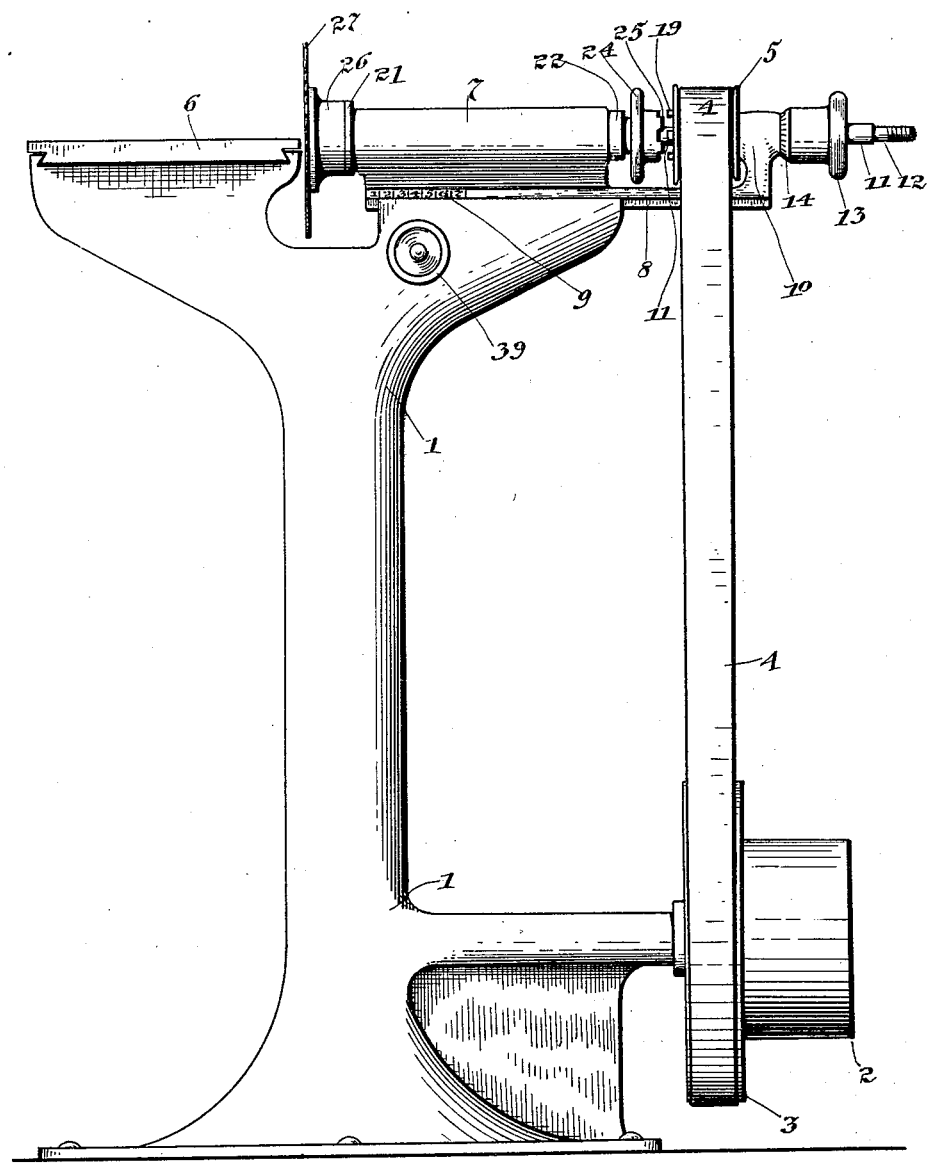

K. HOEPFNER.
COMBINED METAL SAW AND TRIMMER.
APPLICATION FILED JAN. 16, 1911.

1,007,355.

Patented Oct. 31, 1911.

2 SHEETS—SHEET 1.

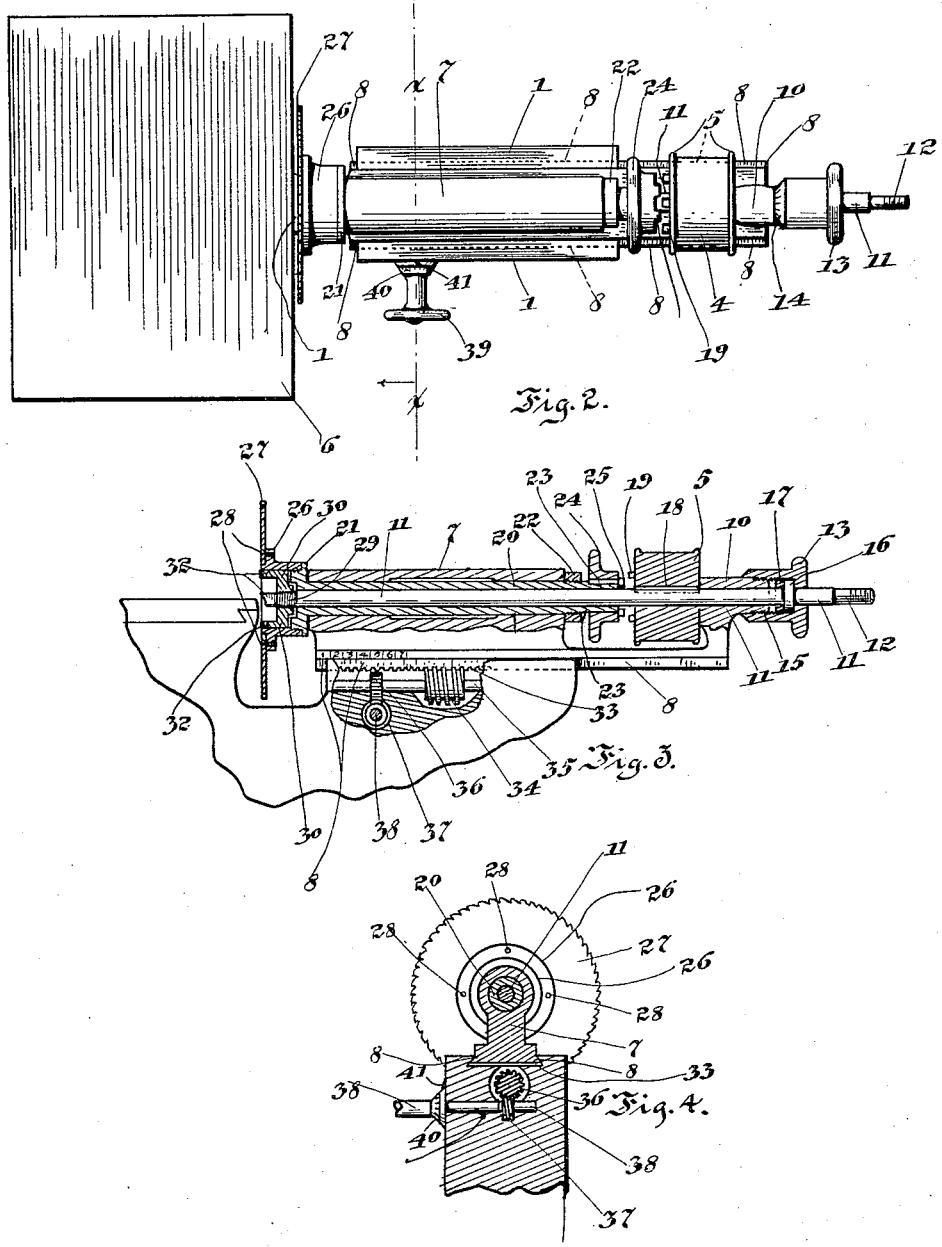

UNITED STATES PATENT OFFICE.

KARL HOEPFNER, OF ALMA, MICHIGAN.

COMBINED METAL SAW AND TRIMMER.

1,007,355. Specification of Letters Patent. Patented Oct. 31, 1911.

Application filed January 16, 1911. Serial No. 602,950.

*To all whom it may concern:*

Be it known that I, KARL HOEPFNER, a citizen of the United States, and a resident of the city of Alma, county of Gratiot, and State of Michigan, have invented certain new and useful Improvements in Combined Metal Saws and Trimmers, of which the following is a specification.

My invention relates to improvements in combined metal-saws and trimmers especially designed for sawing and trimming linotype slugs, but which may be employed for sawing all kinds of metallic and other hard material.

The object of my invention is to provide a rotary metal-saw and means for adjusting the same for accurately cutting linotype slugs without adjustment of the table upon which the slugs are temporarily secured.

A further object of my invention is to provide independent means for adjusting the trimmer which is employed in conjunction with the rotary saw.

Other objects will appear hereinafter.

With these objects in view my invention consists in the novel construction and arrangements of parts as will be hereinafter described and claimed.

My invention will be more readily understood by reference to the accompanying drawings, and in which—

Figure 1 is a side elevation of a metal-saw embodying my invention, Fig. 2 is a top plan view thereof, Fig. 3 is a fragmentary vertical longitudinal section of the saw mechanism, Fig. 4 is a transverse section taken on line $x$—$x$ of Fig. 2, and Fig. 5 is an enlarged detail elevation.

The preferred form of construction for carrying my invention into effect as illustrated in the accompanying drawings, comprises a metallic support 1 upon which the usual pulleys 2 and 3 are mounted. The belt 4 passing over the driving pulley 3 transmits motion to the driven pulley 5 which is secured to the saw arbor as will be hereinafter described. Mounted upon the support 1 is a transversely slidable table 6 to which the slugs or other material to be sawed is temporarily secured in a manner well known to those skilled in the art. A longitudinal movable member 7 carrying the rotary saw is mounted in the top of the support 1 by means of dove-tailed flanges 8 as clearly illustrated in Figs. 1 and 4. Graduations 9 are provided on the member 7 adjacent the support 1 for determining the longitudinal position of said member. An extension 10 is formed on the member 7 in which the saw arbor 11 is journaled at one end, said arbor having a reduced threaded extremity 12 by means of which a buffing wheel, emery wheel or other device may be secured to said arbor. A hand gage wheel 13 provided with graduations 14 is connected to the extension 10 by threading as at 15, so that turning of said gage wheel as determined by said graduations, will move the same longitudinally relative to the extension 10 and member 7. The arbor 11 is provided with a circumferential collar 16 which is seated in the hand wheel 13 and held from longitudinal movement therein by means of a nut 17 which is screwed into said hand wheel as clearly illustrated in Fig. 3. Thus it is clear that when the hand wheel 13 is rotated in either direction, that the arbor 11 is given a longitudinal movement, the extent of which is indicated by the graduations 14. The pulley 5 is secured to the arbor 11 by means of a key 18 and the same is provided with laterally extending integral clutch teeth 19 as shown in Fig. 3. A sleeve 20 is journaled in the support 1 and is provided at one end with a flange 21 and at the other with a nut 22 which serve to prevent longitudinal movement of the sleeve. To an extension 23 of the sleeve 20 a hand operated clutch member 24 is splined, said clutch member being adapted to move longitudinally and to connect rigidly with the pulley 5 by means of clutch teeth 25 engaging the teeth 19. By this means the sleeve 20 may or may not be driven with the arbor 11 at the will of the operator.

To the flange 21 a saw hub 26 is screwed as illustrated in Fig. 3, a saw 27 being detachably secured to said hub by means of a plurality of screws 28. A threaded extension 29 is provided on the arbor 11, and to this extension a saw trimmer 30 is screwed, the bore of the hub 26 being of such a size as to readily receive said trimmer. The trimmer 30, as illustrated in detail in Fig. 5, is provided with a hub 31 and with a series of peripheral teeth 32 which, when in operative position, project slightly beyond one face of the saw 27 as will be noted by reference to Fig. 3.

From the foregoing construction, it is apparent that the sleeve 20 carrying the saw 27 is so mounted as to be non-adjustable in the member 7, but that the arbor 11 carrying the trimmer 30 is longitudinally adjustable relative to said member, hence the degree of projection of the teeth 32 beyond the face of the saw 27 may be regulated as desired by the operator.

As aforesaid, the member 7 is longitudinally slidable in the support 1, and the means for producing the movement of said member 7 comprises a series of rack teeth 33 formed in the lower surface of the member 7, and a worm 34 meshing with said teeth. The worm 34 is formed integral with an arbor 35 which is mounted in a longitudinal position, as shown in Fig. 3, and carries a worm wheel 36 which is so mounted in the support 1 as to prevent longitudinal movement of the arbor 35. The worm wheel 36 is rotated in either direction by means of a worm 37 carried on the transversely extending arbor 38 which is provided at its forward extremity with a hand operating wheel 39. An annular graduated flange 40 is provided on the arbor 38 and positioned contiguous to the front surface of the support 1 as shown in Fig. 4. In turning the arbor 38 by means of the operating wheel 39 the graduations of the flange 40 pass the small projection 41 formed on the face of the support 1, hence the number and fractions of turns of said arbor may be readily counted. This worm and gear construction provides an accurate and positive means for adjusting the longitudinal position of the member 7 and consequently the saw 27, it being understood that said saw and the trimmer 30 are simultaneously moved when the hand wheel 39 is rotated. By this means of adjustment the slugs which are secured to the table 6 are cut accurately as desired to the one-thousandth of an inch, there being no longitudinal movement of said table as provided in machines of the conventional type.

In the operation for severing and trimming the end of a slug, the same is first secured to the table 1 in approximately the correct position, then the exact location of the cut is determined by rotating the hand wheel 39, several turns of the latter being necessary in order to produce a slight longitudinal movement of the saw 27. A single transverse movement of the saw table 6, causes the slug to be severed by the saw 27 and to be trimmed by the trimmer 26, the adjustment of the latter with reference to the saw 27 being accomplished as hereinbefore described.

A saw of the construction set forth saws and trims slugs at one movement of the sliding table; it can be instantly gaged by a simple movement of the hand, and can be operated by a printer or other tradesman familiar with such operations.

While I have illustrated and described the preferred construction for carrying my invention into effect, this is capable of variation and modification without departing from the spirit of the invention. I therefore, desire to avail myself of such variations and modifications as come within the scope of the appended claims.

Having described my invention what I claim as new and desire to secure by Letters Patent is:—

1. In a rotary saw and trimmer mechanism, a support and a transversely slidable table mounted thereon, a longitudinally adjustable member mounted on said support, a sleeve journaled in said member, a rotary saw carried by said sleeve, an arbor journaled in said sleeve, a trimmer mounted in said saw and carried by said arbor and means for operating said arbor and said sleeve, substantially as described.

2. In a rotary saw and trimmer mechanism, a support and a transversely slidable table mounted thereon, a longitudinally adjustable member dove-tailed to said support, a longitudinal sleeve journaled in said member, means for preventing longitudinal movement of said sleeve in said member, a rotary saw carried by said sleeve at one end and a clutch member at the other, an arbor journaled in said sleeve, a pulley carried by said arbor and adapted to be clutched into engagement with said clutch member, and a trimmer mounted in said saw and carried by said arbor, substantially as described.

3. In a rotary saw and trimmer mechanism, a support and a transversely slidable table mounted thereon, a longitudinally adjustable member mounted on said support, a longitudinally disposed sleeve journaled in said member, means for preventing longitudinal movement of said sleeve in said member, a rotary saw carried by said sleeve in one end and a toothed clutch member at the other, an arbor journaled in said sleeve, a pulley carried by said arbor and having laterally extending teeth adapted to be clutched into engagement with the teeth of said clutch member, a trimmer mounted in said saw and carried by said arbor, and means for adjusting said arbor longitudinally, substantially as described.

4. In a rotary saw and trimmer mechanism, a support and a table mounted thereon, a longitudinally adjustable member provided on said support, a sleeve journaled in said member, means for preventing longitudinal movement of said sleeve in said member, a rotary saw carried by said sleeve at one end and a clutch member at the other, an arbor journaled in said sleeve, a pulley carried by said arbor and adapted to be clutched into engagement with said clutch member, a trimmer having a plurality of teeth axially mounted in said saw and carried by said arbor, and means for adjusting said member comprising a hand wheel mounted in said support, and worm-and-gear mechanism connecting said hand wheel with said member, substantially as described.

5. A rotary saw and trimmer mechanism comprising a support and a transversely slidable table mounted thereon, a longitudinally adjustable member mounted on said support adjacent said table, a sleeve journaled in said member, an arbor journaled in said sleeve and adapted to be longitudinally adjustable therein, means for adjusting said adjustable member, independent means for adjusting said arbor, means for registering the adjustment of said adjustable member and arbor, a saw secured to the end of said sleeve, and a trimmer secured to the end of said arbor, substantially as described.

6. A rotary saw and trimmer mechanism comprising a rotary saw, a trimmer mounted in said saw, means for longitudinally adjusting the positions of said saw and trimmer relatively to each other, and means for operating said trimmer independently of said saw, substantially as described.

In testimony whereof I have signed my name to this specification in the presence of two subscribing witnesses.

KARL HOEPFNER.

Witnesses:
 HELEN F. LILLIS,
 JOSHUA R. H. POTTS.

Copies of this patent may be obtained for five cents each, by addressing the "Commissioner of Patents, Washington, D. C."